O. E. MICHAUD.
ROLLER BEARING.
APPLICATION FILED MAY 2, 1910.
997,573.
Patented July 11, 1911.
2 SHEETS—SHEET 1.
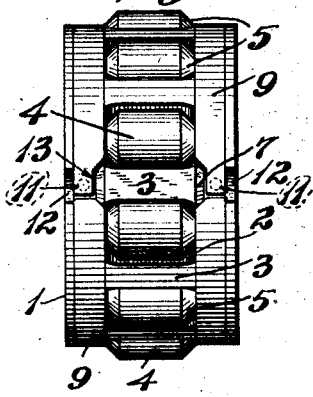
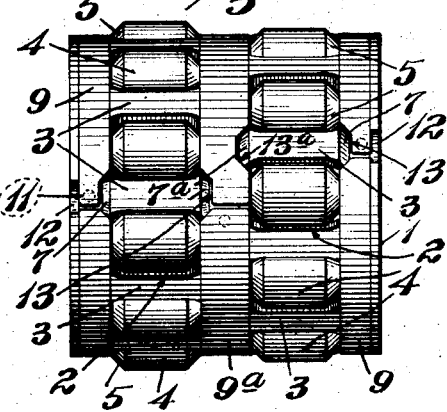
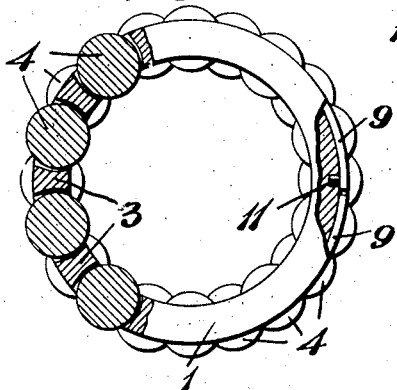
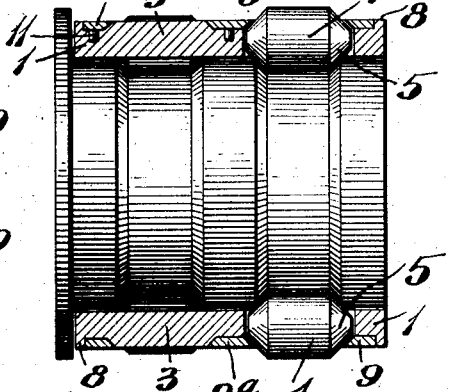
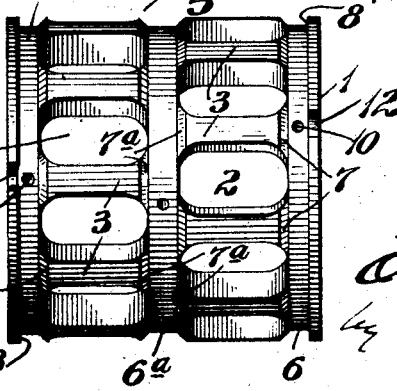
Witnesses:
Edgar J. Farmer
G. A. Pennington
Inventor:
O. E. Michaud,
by Bond & Dane
attys.

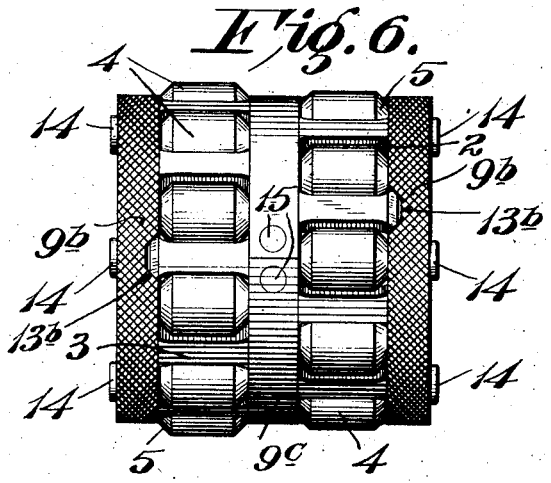
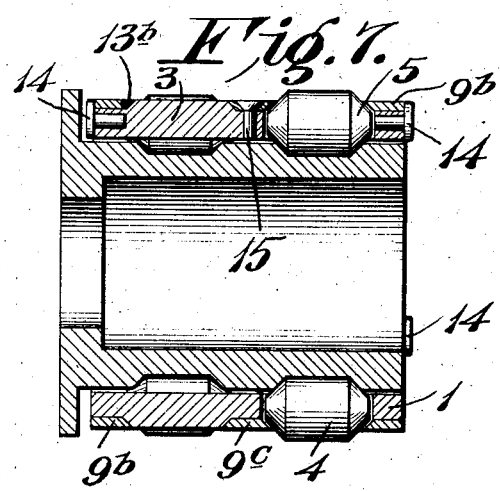
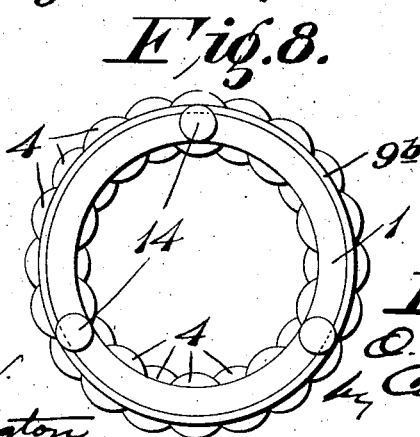

UNITED STATES PATENT OFFICE.

ONESIME E. MICHAUD, OF ST. LOUIS, MISSOURI.

ROLLER-BEARING.

997,573.  Specification of Letters Patent.  Patented July 11, 1911.

Application filed May 2, 1910. Serial No. 558,954.

*To all whom it may concern:*

Be it known that I, ONESIME E. MICHAUD, a citizen of the United States, and a resident of the city of St. Louis and State of Missouri, have invented a certain new and useful Improvement in Roller-Bearings, of which the following is a specification.

This invention relates to roller bearings and more particularly to spacing cages and retaining devices for the rollers.

It has for its principal objects to secure the proper spacing of the rollers and permit the rollers to have sufficient play so as to avoid undue friction between the same and the cage; to provide for holding the rollers intact with the spacing cage when the same are removed from the wheel or axle spindle, as the case may be; to permit of readily removing and replacing the rollers in the cage; and to secure certain advantages hereinafter more fully appearing.

The invention consists in the parts and in the arrangements and combinations of parts hereinafter described and claimed.

In the accompanying drawings which form part of this specification and wherein like symbols refer to like parts wherever they occur, Figure 1 is a side view of a spacing cage arranged for a single set of rollers according to my invention; Fig. 2 is a side view of a spacing cage arranged for a double set of rollers according to my invention; Fig. 3 is a view partly in end elevation and partly in section showing the coöperative relation of the spacing cage, rollers and retaining band; Fig. 4 is a longitudinal section through a spacing cage arranged for a double set of rollers and showing the device mounted on an inner or spindle bearing sleeve; Fig. 5 is a side view of a double spacing cage with the rollers and retaining bands removed therefrom; Fig. 6 is a view similar to Fig. 2 showing a modified construction and arrangement of the retaining bands; Fig. 7 is a longitudinal section through the cage shown in Fig. 6; and Fig. 8 is an end view of the cage.

As shown in Figs. 1 to 5 of the drawings, the spacing cage 1 comprises a substantially cylindrical sleeve having a multiplicity of elongated openings 2 therein. These openings are arranged in annular series and spaced an equal distance apart, so that the cage comprises concentric end and middle ring portions which are connected by bars 3. The openings 2 are of sufficient proportions to receive rollers 4 having conical or tapered end portions 5. The width of the openings 2 at the outer face of the cage sleeve is greater than the diameter of the rollers while their width at the inner side of the cage sleeve is less than the diameter of the rollers, so that the opposite faces of the bars 3 near the inner side of the cage sleeve underhang the rollers, whereby the rollers are prevented from being passed entirely through the openings 2.

The outer face of the cage sleeve 1 is grooved annularly as at 6 adjacent to and overlapping the end portions of the openings 2. The side walls of the grooved portions 6 adjacent to the ends of the openings 2 are beveled as at 7 while the walls of the grooved portions at the ends of the cage are preferably perpendicular as at 8. Split spring rings 9 are fitted in the grooved portions 6 and these rings have one of their inner edge portions beveled or chamfered to correspond with the beveled portions 7 of the grooves, while the opposite edge portions of the rings are square and adapted to fit snugly against the square shoulder 8 at the outer edges of the grooves 6. The beveled edge portions of the split spring bands 9 overhang the tapered or conical end portions 5 of the rollers 4 so as to retain the rollers against outward radial movement in the openings 2. To hold the bands against slipping around the groove 6, a hole or depression 10 is preferably provided in the bottom of the groove, and a pin or stud 11 is formed or secured on the end of the retaining band and adapted to snap into said depression or hole 10. To facilitate the removal of the retaining bands 9, notches 12 are preferably formed in the flange portions or shoulders 8 at the ends of the cage ring so that a suitable instrument may be inserted under the band at that point and the end of the band pried outwardly in order to release the stud 11 from the hole 10. The bands are suitably notched, preferably at their meeting end portions as at 13; and said notched portions are adapted to be moved in registry with the ends of the respective openings 2, so that the rollers 4 can be readily removed and replaced whenever it is so desired.

The cage sleeve or ring may be arranged to accommodate a single series of rollers or the same may be arranged to accommodate a double set or plurality of sets of rollers.

As shown in Fig. 2, the cage is arranged for a double set of rollers and the spaces for one series are staggered with respect to those of the other series. In the case of a double or greater number of series of rollers being provided, the intermediate grooves 6ª have both of their sides beveled as at 7ª; and the split spring retaining band 9ª has both of its edge portions beveled to correspond to the bevel of the sides of the grooves 6ª. This band 9ª is provided with a notched portion 13ª in addition to its notched portion 13 which is similar to the notches in the bands 9.

In Figs. 6 to 8, inclusive, continuous retaining bands 9ᵇ are substituted for the split bands 9; and to permit said bands 9ᵇ to be slipped endwise on the cage ring 1, the annular end flanges 8 are eliminated. To hold said retaining bands 9ᵇ in place, studs 14 are driven tightly in holes provided for the purpose in the opposite ends of the cage ring 1 so that the heads of said studs project over the outer edge portions of the bands. The outer faces of these bands 9ᵇ are preferably knurled or roughened so that the bands may be readily rotated about the cage ring. Notches 13ᵇ are provided in the inner edge portions of these bands 9ᵇ for the same purpose as the notches 13 in the bands 9. The middle retaining band 9ᶜ is preferably, for convenience in assembling, a split band whose meeting end portions are riveted as at 15 to the cage ring, as this band need not necessarily be rotated nor provided with notches in its edge portions.

Obviously, the device admits of considerable modification without departing from my invention. Therefore, I do not wish to be limited to the specific construction and arrangement shown.

What I claim is:

1. A roller bearing comprising a cage sleeve having an annular series of openings therein, rollers fitted loosely in said openings and having reduced end portions, and retaining bands fitted on the outer side of said cage sleeve so as to be normally stationary but adapted to be rotated thereon and having their inner edge portions notched and arranged to overhang the reduced end portions of the rollers, whereby said rollers are normally retained against removal outwardly from the respective openings in said cage sleeve.

2. A roller bearing comprising a cage sleeve having an annular series of openings therein, a series of rollers fitted loosely in the openings in said cage sleeve, the end portions of said rollers being reduced, and the width of the openings at the inner side of the cage sleeve being less than the diameter of the rollers and the width of said openings at the outer side of the cage sleeve being greater than the diameter of the rollers, and retaining bands fitted on the outer side of said cage sleeve coincident with the ends of said openings therein, the inner edge portions of said retaining bands being arranged to overhang the reduced end portions of the rollers so that said rollers are normally held against removal outwardly from the openings in the cage sleeve.

3. A roller bearing comprising a cage sleeve having an annular series of openings therein, a series of rollers fitted loosely in said openings, said rollers having reduced end portions, and the width of the openings at the inner side of the cage ring being less than the diameter of the rollers and the width of the openings at the outer side of the cage sleeve being greater than the diameter of the rollers, and retaining bands fitted on the outer side of said cage sleeve so as to be normally stationary but adapted to be rotated thereon and arranged so that their inner edge portions overhang the reduced ends of the rollers, said retaining bands having notches in their overhanging edge portions.

4. A roller bearing comprising a cage sleeve having an annular series of openings therein and annular peripheral grooves adjacent to the ends of said openings, rollers fitted in said openings and having reduced end portions, and retaining bands fitted in said annular grooves so as to be normally stationary but adapted to be rotated therein and having their edge portions notched and arranged to overhang the reduced end portions of the rollers, whereby said rollers are retained against outward radial movement.

5. A roller bearing comprising a cage ring having an annular series of openings therein and a series of rollers fitted loosely in the openings in said cage ring, the end portions of said rollers being reduced, and the width of the openings at the inner side of the cage ring being less than the diameter of the rollers and the width of said openings at the outer side of the cage ring being greater than the diameter of the rollers, and said cage ring having annular peripheral grooves adjacent to the ends of the openings therein, and retaining bands fitted in said annular grooves and arranged so that their inner edge portions overhang the reduced end portions of the rollers.

6. A roller bearing comprising a cage ring having an annular series of openings therein and a series of rollers fitted loosely in said openings, said rollers having reduced end portions, and said ring having annular peripheral grooves adjacent to the ends of the openings therein, and retaining bands fitted in said annular grooves so as to be normally stationary but adapted to be rotated therein and arranged so that their inner edge portions overhang the reduced ends of the rollers, said retaining bands having notches in their edge portions which are adjacent to the ends of the openings in the cage ring, and a releasable device for normally holding said retaining bands from slipping in said grooves, whereby the rollers are normally retained in the openings in said cage ring, and whereby, also, said bands may be moved to bring their notched portions in register with any of the openings in the cage ring, so that the rollers may be removed and replaced.

7. A roller bearing comprising a cage ring having an annular series of openings therein and a series of rollers fitted loosely in said openings, said rollers having reduced end portions, and the width of the openings at the inner side of the cage ring being less than the diameter of the rollers, and the width of said openings at the outer side of the cage ring being greater than the diameter of the rollers, said cage ring having annular peripheral grooves adjacent to the ends of the openings therein, split spring retaining bands fitted in said annular grooves so as to be normally stationary but adapted to be rotated therein and arranged so that their inner edge portions overhang the reduced end portions of the rollers, and a projection on the inner face of one end portion of said bands adapted to fit in an opening in the coöperating annular groove, whereby said bands are normally held against rotation, and said bands having notches in their edge portions adjacent to said openings and adapted to register with any of said openings when the retaining bands are rotated, whereby the rollers may be removed and replaced.

8. A roller bearing comprising a cage ring having an annular series of openings therein and a series of rollers fitted loosely in said openings, said rollers having tapered end portions, and said cage ring having annular peripheral grooves adjacent to the ends of the openings therein, and retaining bands detachably fitted in said annular grooves and having beveled edge portions arranged to overhang the tapered end portions of the rollers.

9. A roller bearing comprising a cage ring having an annular series of openings therein and a series of rollers fitted loosely in said openings, said rollers having conical end portions, and said cage ring having annular peripheral grooves adjacent to the ends of the openings therein, retaining bands fitted in said annular grooves so as to be normally stationary but adapted to be rotated therein and having beveled edge portions arranged to overhang the conical end portions of the rollers, said retaining bands having notches in their beveled edge portions, a device for normally holding said bands from slipping in said annular grooves, said device being releasable so that said bands may be rotated to move the notched portions thereof in registry with any of the openings in the cage ring so that the rollers may be removed and replaced.

10. A roller bearing comprising a cage ring having an annular series of openings therein and a series of rollers fitted loosely in said openings, said rollers having conical end portions, and the width of the openings in said cage ring at the inner side thereof being less than the diameter of the rollers and the width of said openings at the outer side of the cage ring being greater than the diameter of the rollers, said cage ring having annular peripheral grooves adjacent to the ends of said openings therein, split spring retaining bands fitted in said annular grooves and having beveled edge portions arranged to overhang the conical ends of the rollers, said split spring bands having notches in their beveled edge portions and a projection on the inner face of one end portion thereof adapted to fit in an opening in the coöperating annular groove, whereby said bands are normally held against rotation but may be rotated to move their notched portions in registry with any of the openings in said cage ring.

11. A roller bearing comprising a cage ring having two annular series of openings therein, the openings of one series being staggered with respect to those of the other series, rollers fitted loosely in each of said series of openings in the cage ring, said rollers having reduced end portions, and said cage ring having annular peripheral grooves adjacent to the ends of the openings therein, retaining bands fitted in said annular grooves and having their edge portions which are adjacent to the openings in the cage ring arranged to overhang the reduced end portions of the rollers, said retaining bands having notches in their overhanging edge portions, and means for normally holding said retaining bands against rotation, said means being releasable so that said bands may be rotated to bring their notched portions in register with any of the adjacent openings so that the rollers may be removed and replaced.

12. A roller bearing comprising a cage ring having a plurality of annular series of openings therein, and a series of rollers fitted loosely in the openings of each series, said rollers having reduced end portions, and said cage ring having annular peripheral grooves adjacent to the ends of the openings therein, the width of the openings in the cage ring at the inner side thereof being less than the diameter of the rollers and the width of the openings at the outer side of the cage ring being greater than the diameter of the rollers, and retaining bands fitted in said annular grooves and having their edge portions adjacent to the ends of said openings in the cage ring arranged to overhang the reduced end portions of the rollers.

13. A roller bearing comprising a cage sleeve having two annular series of openings therein, the openings of one series being staggered with respect to those of the other series, a series of rollers fitted loosely in the openings of each of said annular series, a retaining band fitted around the outer side of said cage sleeve and arranged so that its edge portions overhang the inner ends of the respective rollers in the two series, and retaining bands fitted on the outer side of said cage sleeve and arranged so that their inner edge portions overhang respectively the outer ends of the rollers of the adjacent series, said last-mentioned retaining bands being normally stationary but adapted to be rotated on said cage sleeve, and said rotatable retaining bands having notches in their inner edge portions.

14. A roller bearing comprising a cage sleeve having a plurality of correlated annular series of openings therein, the openings of each series being staggered with respect to those of the other series, a series of rollers fitted loosely in the openings of each of said annular series, the ends of said rollers being reduced and the width of the openings at the inner side of the cage sleeve being less than the diameter of said rollers, and retaining bands fitted around the outer side of said cage sleeve and arranged so that their edge portions overhang the ends of the respective rollers, whereby said rollers are normally retained against removal outwardly from the openings in the cage sleeve, and the overhanging edge portions of said retaining bands having notches therein adapted to be moved into registry with said openings in the cage sleeve.

15. A roller bearing comprising a cage sleeve having an annular series of openings therein, rollers fitted loosely in said openings, retaining means on said cage sleeve coöperating with the respective rollers at one end thereof and a retaining band fitted on the outer side of said cage sleeve so as to be normally stationary but adapted to be rotated thereon and having its inner edge portion arranged to overhang the adjacent end portions of the rollers, whereby said rollers are normally held against removal outwardly from the respective openings in said cage sleeve, and said band having a notch adapted to be moved into coöperative relation to the openings in said cage sleeve so that the adjacent end portions of the respective rollers may pass therethrough.

Signed at St. Louis, Missouri, this 25th day of April, 1910.

ONESIME E. MICHAUD.

Witnesses:
 G. A. PENNINGTON,
 J. B. MEGOWN.